United States Patent [19]

Mankey

[11] 4,359,116

[45] Nov. 16, 1982

[54] GROUND PRESSURE REDUCING UNDERCARRIAGE UNIT

[75] Inventor: Harry S. Mankey, Dallas, Tex.

[73] Assignee: Standard Manufacturing Company, Incorporated, Dallas, Tex.

[21] Appl. No.: 113,590

[22] Filed: Jan. 21, 1980

[51] Int. Cl.³ .................... B62D 61/10; B62D 61/12
[52] U.S. Cl. .................... 180/6.48; 180/6.54; 180/22; 180/24.05; 180/24.08; 180/24.12
[58] Field of Search .................... 180/6.2, 6.44, 6.48, 180/6.5, 6.54, 6.58, 6.62, 6.66, 21, 22, 24.01, 24.08, 24.12, 297, 24.05, 9.62; 74/665 L, 665 M, 665 N

[56] References Cited

U.S. PATENT DOCUMENTS

| | | | |
|---|---|---|---|
| 2,821,949 | 2/1958 | Uyehara | 180/24.08 X |
| 3,166,141 | 1/1965 | Shields et al. | 180/6.2 X |
| 3,198,551 | 8/1965 | Garner | 180/6.48 |
| 3,444,837 | 5/1969 | Donofrio | 180/6.2 X |
| 3,785,449 | 1/1974 | Ries | 180/9.62 X |
| 3,799,362 | 3/1974 | Oswald et al. | 180/6.48 X |

Primary Examiner—Joseph F. Peters, Jr.
Assistant Examiner—Donn Mc Giehan
Attorney, Agent, or Firm—Richards, Harris & Medlock

[57] ABSTRACT

A wheeled undercarriage unit (10) for supporting and propelling a mechanism without causing excessive ground pressure comprises elongate hollow side frames (12, 14) rigidly interconnected by cross frames (16, 18). Ten wheels (20, 22, 24, 26, 28, 30) are rotatably supported on the side frames (12, 14) with four wheels being disposed inboard at the ends of the side frames. The wheels on each side of the unit (10) are drivingly interconnected by transmissions located within the side frames (12, 14). A second embodiment (110) includes twelve wheels with six wheels being mounted inboard of the side frames (12', 14'). A third embodiment (120) includes twelve wheels with eight wheels outboard and four wheels inboard. The middle wheels in each embodiment extend below a plane lying tangent to the endmost wheels to facilitate skid steering.

23 Claims, 9 Drawing Figures

GROUND PRESSURE REDUCING UNDERCARRIAGE UNIT

TECHNICAL FIELD

The present invention relates in general to an undercarriage unit for use with an adverse terrain vehicle. More particularly, this invention concerns a wheeled undercarriage for supporting and propelling a mechanism without causing excessive ground pressure.

BACKGROUND ART

Traditionally, vehicles which operate over adverse terrain have employed track drive systems. Track driven bulldozers, loaders, excavators, cranes and other heavy industrial vehicles have been in use for decades, as have armored tanks and other track driven military vehicles. The tracks are comprised of rigid tread elements pivotally interconnected in belts supported for movement around courses on the sides of the vehicle. Propulsion is effected by simultaneous drive of the tracks, and the vehicle is steered by differential drive thereof.

The capability of operating over rough ground is the primary advantage of a track driven system. By nature, however, vehicles incorporating such drive systems cause at least some surface damage during operation, and particularly while maneuvering. Surface damage is not a major problem as far as operation over open ground, but it can be a serious drawback with respect to operation over smooth or paved surfaces due to the resultant permanent damage thereto. Consequently, track driven vehicles have been restricted to operation over rough or unprepared surfaces as a practical matter.

More recently, wheeled vehicles have been developed which are capable of operation over smooth and rough surfaces without causing such surface damage. U.S. Pat. No. 3,799,362, entitled "Six Wheel Material Handling Vehicle" and assigned to the assignee hereof, illustrates a successful example of one such vehicle. Other vehicles incorporating multiple wheels and skid steering principles have been developed especially for use with particular mechanisms.

In addition, multiple wheeled undercarriage assemblies utilizing lowered middle wheels to facilitate skid steering have been developed heretofor for supporting and propelling some mechanisms. With larger and thus heavier mechanisms, however, the advantages of such undercarriage assemblies have been offset to a considerable extent by reduced maneuverability and turning ability stemming from excessive ground pressure beneath the wheels. Excessive ground pressure in turn causes ruts and other surface damage. A need has thus arisen for a multi-wheeled undercarriage unit for supporting and propelling a relatively heavy mechanism over smooth or adverse terrain without substantial losses in maneuverability or turning ability and within acceptable ground pressure levels.

DISCLOSURE OF INVENTION

The present invention comprises a multi-wheeled undercarriage unit which overcomes the foregoing and other difficulties associated with the prior art. In accordance with the invention, an undercarriage unit includes a pair of longitudinal side frame structures with cross frame structures rigidly secured therebetween. Axles are rotatably supported along each side frame, and tired wheels are mounted on the ends of the axles. The endmost axles on each side frame structure support both inboard and outboard wheels. The axles on each side of the undercarriage unit are drivingly interconnected by transmissions contained by the side frame structures. The middle wheel or wheels on each side of the unit extend below the endmost wheels to facilitate skid steering. Predetermined mounting pads for mating the wheeled undercarriage unit with a mechanism to be supported and propelled are provided on the side frame structures. Use of the invention herein improves stability and versatility of the vehicle while maintaining good maneuverability without exceeding acceptable ground pressure levels.

In accordance with more specific aspects of the invention, an undercarriage unit comprises a pair of box-beam side frames extending in longitudinally spaced relationship. The side frames are rigidly interconnected by cross frames. One inventive embodiment includes three axles rotatably supported in longitudinally spaced relationship along each side frame, and another embodiment includes four axles similarly supported. The axles on each side frame are interconnected by a hydrostatic drive system including sprockets and chains. Pneumatic tired wheels are mounted on the ends of the axles such that 10 or 12 wheels can be utilized. The wheels are arranged in a way such that turning ability is not unduly affected. Preferably, the middle pair(s) of wheels extend below a plane lying tangent to the bottoms of the endmost wheels for gaining the advantage of a short wheelbase to facilitate skid steering over a smooth surface, together with that of a relatively long wheelbase for greater stability during operation over rough terrain. The middle pair(s) of wheels can be relatively larger, or of the same size as the other wheels and mounted for rotation about axes located below the axes of the end wheels. Mounting pads are provided on the side frames for mating the undercarriage unit to a mechanism to be supported and propelled.

BRIEF DESCRIPTION OF DRAWINGS

A more complete understanding of the invention can be had by referring to the following Detailed Description in conjunction with the accompanying Drawings, wherein.

DETAILED DESCRIPTION

Figure 1:
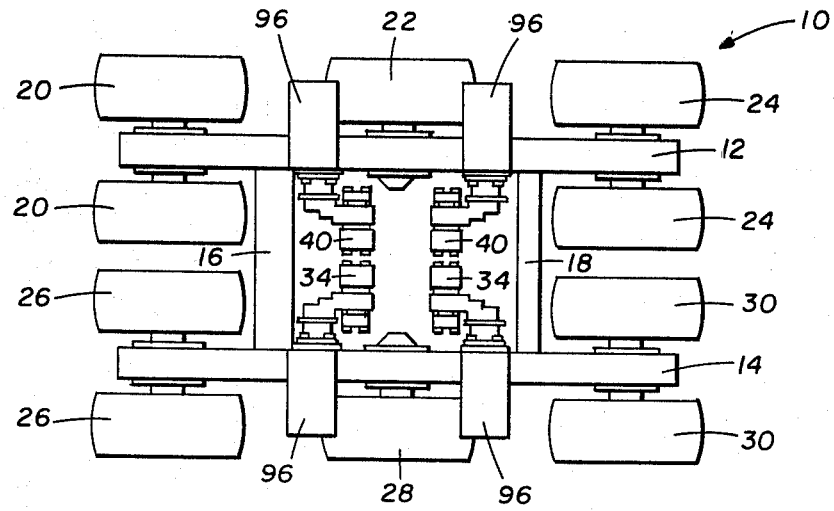
FIG. 1 is a top view of an undercarriage unit incorporating a first embodiment of the invention.

Referring now to the Drawings, wherein like reference numerals designate like or corresponding parts throughout the several views, and particularly referring to FIG. 1, there is shown an undercarriage unit 10 incorporating a first embodiment of the invention. Undercarriage unit 10 comprises a multi-wheeled assembly which is particularly adapted for use with an adverse terrain vehicle such as a crane, loader, excavator or the like having a gross weight up to 150,000 pounds. Use of undercarriage unit 10 facilitates vehicle operation over rough terrain, as well as over a smooth surface.

Although multi-wheeled undercarriage assemblies have been developed heretofore, difficulties have arisen from excessive ground pressure loadings generated underneath relatively heavy vehicles. Excessive ground pressure tends to offset some of the advantages of such wheeled undercarriages by adversely affecting maneuverability and causing surface damage. It has been found desirable to keep ground pressure within acceptable limits, such as below 10 psi, in order to avoid such consequences. Use of undercarriage unit 10 avoids excessive ground pressures without undue sacrifice of maneuverability or turning ability.

Figure 2:
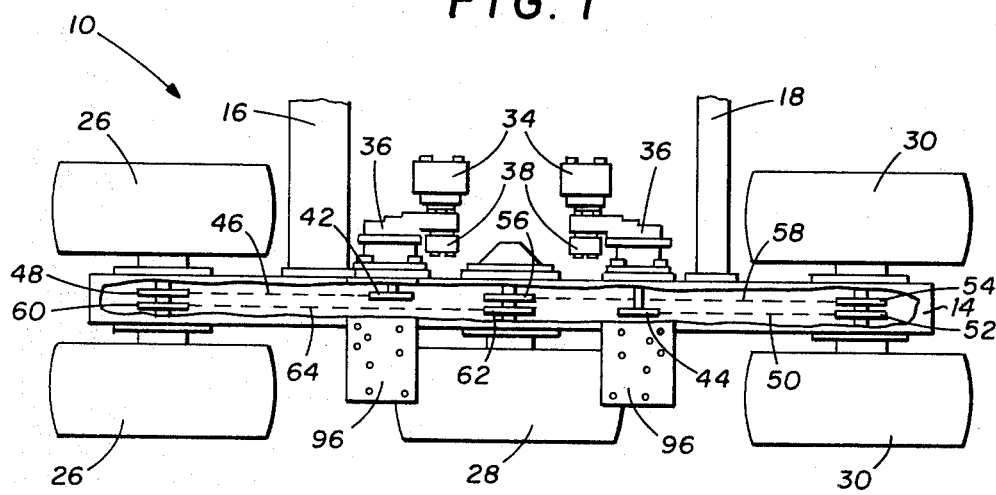
FIG. 2 is an enlarged top view of part of the undercarriage unit shown in FIG. 1, partially cut away.
Figure 3:
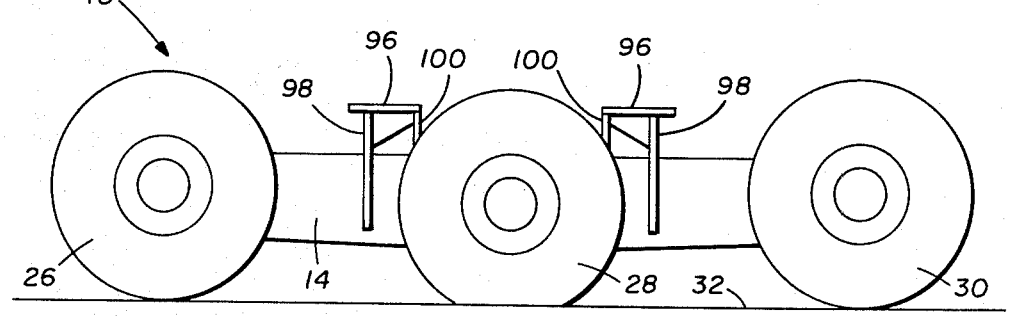
FIG. 3 is an enlarged side view of the undercarriage unit shown in FIG. 1.

The constructional details of undercarriage unit 10 are shown in FIGS. 1-3. Unit 10 includes a pair of longitudinally extending side frames 12 and 14 interconnected by a pair of cross frames 16 and 18. Side frames 12 and 14 comprise elongate, hollow load-bearing frame structures, and are preferably constructed from steel plates welded together to form box-beam structures of generally rectangular cross section. Side frames 12 and 14 are preferably of sealed construction so that lubricant can be carried for the drive transmission therein, with drain plugs, (not shown) provided in the bottom surfaces of the frames for drainage of the lubricant. Each of the side frames 12 and 14, for example, can be about 144 inches long, 10 inches wide and 23 inches deep.

Cross frames 16 and 18 are rigidly secured, such as by means of welding, between side frames 12 and 14. Preferably, cross frames 16 and 18 are about 57 inches in length and comprise I-beam structures. The frame of undercarriage unit 10 thus comprises a pair of tubular side frames 12 and 14 rigidly joined together by a pair of cross frames 16 and 18.

Undercarriage unit 10 is supported by ten tired wheels, which are mounted for rotation on side frames 12 and 14. Side frame 12 rotatably supports end wheels 20, middle wheel 22 and end wheels 24. Side frame 14 rotatably supports end wheels 26, middle wheel 28 and end wheels 30. Two pairs of wheels and one single wheel are thus mounted on each side frame with four of the ten total wheels of undercarriage unit 10 being located inboard or between the side frames.

Middle wheels 22 and 28 protrude below a plane 32, as is best shown in FIG. 3. Plane 32 lies tangent to the bottom surfaces of end wheels 20, 24, 26 and 30. In accordance with the preferred construction, wheels 20-30 are of equal diameters with middle wheels 22 and 28 being mounted for rotation about a common axis positioned beneath the rotational axes of the endmost pairs of wheels. For example, wheels 20-30 can be of 52 inch diameters, with the middle wheels being positioned about three inches lower than the endmost wheels. If desired, relatively larger wheels can be used for middle wheels 22 and 28 to achieve the same effect. It will be understood that undercarriage unit 10 utilizes a multi-wheeled configuration wherein the bottoms of the middle two wheels extend below those of the endmost eight wheels.

The use of relatively lower middle wheels 22 and 28 in undercarriage unit 10 comprises a significant feature of the invention. The advantages of both short and long wheelbases are available by means of this undercarriage configuration. A short wheelbase facilitates skid steering of a vehicle but renders it more susceptible to pitching motion. On the other hand, a longer wheelbase increases longitudinal stability but makes skid steering of the veicle more difficult.

The arrangement of wheels on undercarriage unit 10 effectively provides two wheelbases for the unit. During operation over a paved or otherwise relatively smooth surface, the vehicle incorporating unit 10 will be able to rock forward or backward slightly depending upon the center of gravity and loading characteristics of the particular mechanism supported by the unit. Resting primarily on the middle pair of wheels 22 and 28 and one endmost set of four wheels 20 and 26 or wheels 24 and 30, the other endmost set of wheels is in reduced contact with the surface. The primary wheelbase of a vehicle incorporating undercarriage unit 10 therefore comprises the longitudinal distance between wheels 22 and 28 and wheels 20 and 26 or wheels 24 and 30. Consequently, less power is required to skid-steer the vehicle, and one set of end wheels serves to limit forward or backward rocking thereof.

During operation over adverse or softer terrain, such as sand, mud or loose dirt, all ten wheels 20-30 firmly engage with the terrain. This is because middle wheels 22 and 28 sink into the ground until flotation occurs. The secondary wheelbase of undercarriage unit 10 thus comprises the longitudinal distance between endmost set of wheels 20 and 26 and endmost set of wheels 24 and 30. Superior traction, stability and control will thus be achieved because all wheels are driven and engaged with the surface.

In addition to the advantages of the lower middle wheels configuration mentioned above, another significant advantage of the invention comprises the arrangement of wheels 20-30 about undercarriage unit 10. Six of the wheels are located outboard of side frames 12 and 14. One wheel from each endmost pair of wheels 20, 24, 26 and 30, however, is positioned inboard of side frames 12 and 14. Wheels 20-30 are thus positioned in a rectangular configuration wherein three wheels define each corner thereof.

Ten wheels in this configuration provide increased contact area with the ground, allowing greater load capacity without exceeding acceptable ground pressure levels and without an undue sacrifice in turning ability. It has been found that a ten-wheeled undercarriage unit 10 can operate at ground pressure levels of 10 psi or less with loads up to 150,000 pounds with only about a 7% loss in turning ability over another undercarriage unit lacking the four inboard wheels and causing unacceptably high ground pressure levels of up to 17 psi. In addition, the triangulation effect of the wheels at the corners of undercarriage unit 10 enhances stability by improving load distribution around the periphery of the unit, which is particularly desirable when the unit is employed to support a crane or other articulating mechanism.

Undercarriage unit 10 includes a drive system, which is best shown in FIG. 2. The wheels on each side of unit 10 are interconnected and driven independently of the wheels of the other side of the unit, both sides being identical but separate. Wheels 26, 28 and 30 on side frame 14 are driven by two motors 34. Each motor 34 is coupled to a speed reducer or gear box 36 mounted on the inner wall of side frame 14. A brake 38 is also coupled to each gear box 36. A similar arrangement of motors 40, gear boxes and brakes are provided for driving wheels 20, 22 and 24 on side frame 12.

Motors 34 and 40 can be either single speed or multi-speed motors. In accordance with the preferred construction of the invention, motors 34 and 40 comprise two-speed hydraulic units operated by remotely located hydraulic pumps (not shown) driven in turn by the engine of the particular mechanism supported by undercarriage unit 10. The drive means for undercarriage unit 10 is thus located in a protected position inboard side frames 12 and 14 and between cross frames 16 and 18.

The axles of wheels 20-30 are drivingly interconnected by separate transmissions located completely within side frames 12 and 14. Chain and sprocket arrangements, which are separate but substantially identical, are utilized in the preferred embodiment of the invention. For example, the axles supporting wheels 26, 28 and 30 on side frame 14 are driven by drive sprockets 42 and 44 connected to the output shafts of gear boxes 36. Drive sprocket 42 is interconnected by chain 46 with a sprocket 48 secured to the axle supporting wheels 26. Drive sprocket 44 is interconnected by a chain 50 with a sprocket 52 mounted on the axle supporting wheels 30. Another sprocket 54 mounted on the axle supporting wheels 30 is connected to a sprocket 56 mounted on the axle supporting middle wheel 28 by chain 58. Another sprocket 60 mounted on the axle supporting wheels 26 is connected to a sprocket 62 mounted on the axle supporting middle wheel 28 by chain 64. Wheels 26, 28 and 30 are thus driven in unison.

It will be apparent that motors 34 on side frame 14 are connected directly to end wheels 26 and 30 only, which are in turn separated coupled to middle wheel 28. Each chain 46, 50, 58 and 64 is thereby exposed to the loading of but one motor 34 to reduce overloading and possible breakage of the chains. This comprises a significant feature of the invention in that drive chain failure is avoided even when undercarriage unit 10 is incorporated into a relatively heavy vehicle.

A similar arrangement of chains and sprockets is employed to drivingly interconnect wheels 20, 22 and 24 carried by side frame 12. Preferably, removable plates (not shown) are provided on the upper surfaces of side frames 12 and 14 for access to transmission components located therein.

Figure 4:
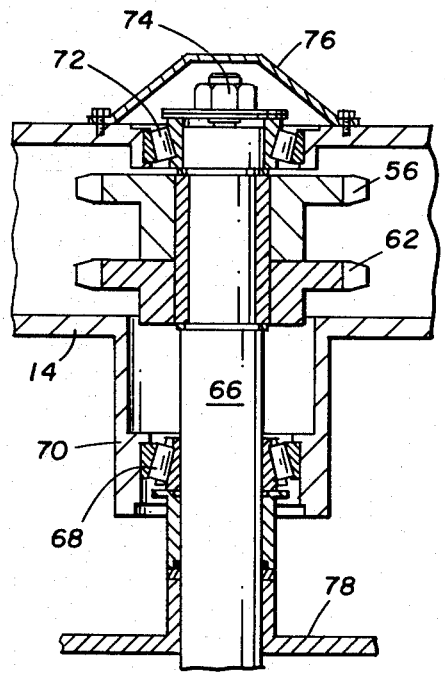
FIGS. 4 and 5 are enlarged section views illustrating details of the invention.
Figure 5:
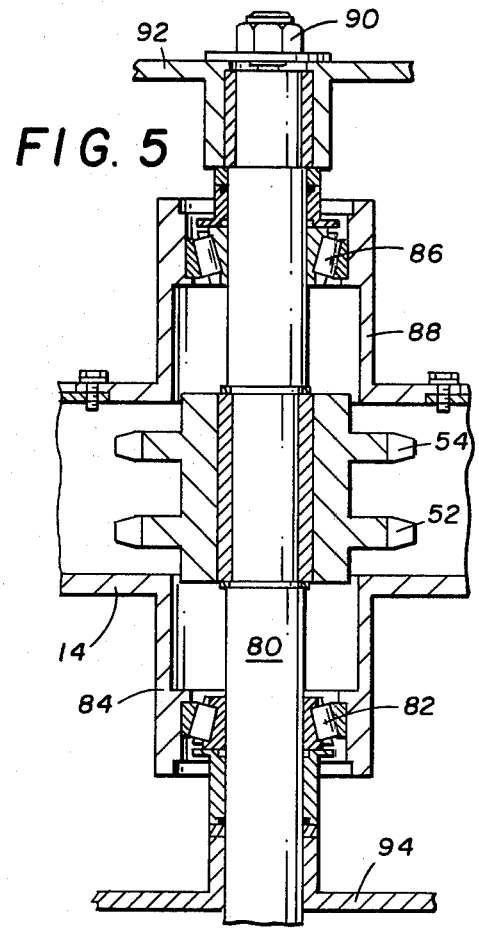

FIGS. 4 and 5 show constructional details of the manner in which wheels 20-30 are rotatably supported on side frames 12 and 14. The axles on which wheels 20-30 are mounted are supported in longitudinally spaced relationship along side frames 12 and 14, and each axle preferably extends through and is rotatably supported in opposite sides of each side frame.

FIG. 4 in particular illustrates an axle 66 supported at the outboard end by an outer bearing assembly 68 located in a cup-like frame extension 70 attached to the outer wall of side frame 14. The inboard end of axle 66 is supported by an inner bearing assembly 72 mounted in the inner wall of frame 14. A nut 74 secures axle 66 to frame 14, and a cover 76 encloses bearing assembly 72 and the nut to protect the inboard end of the axle. Sprockets 56 and 62 are fastened to axle 66 inside frame 14 and a wheel receiving member or flange 78 is provided on the outboard end of the axle for attaching wheel 28 thereto. The mounting of axle 66 in FIG. 4 is thus representative of the mounting for wheel 22 as well as wheel 28 on undercarriage unit 10.

The endmost wheels of undercarriage unit 10 are supported in pairs on the inboard and outboard ends of axles as shown in FIG. 5. The outboard end of axle 80 is supported by an outer bearing assembly 82 located in a cup-like frame extension 84 attached to the outer wall of side frame 14. The inboard end of axle 80 is supported by an inner bearing assembly 86 mounted in a removable bearing retainer 88 secured to the inner wall of frame 14. Sprockets 52 and 54 are secured to axle 80 inside frame 14. A nut 90 secures an inside wheel receiving member or flange 92 to the inboard end of axle 80, with an outside wheel receiving member or flange 94 being provided on the opposite end of the axle. The mounting of axle 80 is thus typical of the manner in which the axles for wheels 20, 24 and 26 are mounted.

Referring again to FIGS. 1-3, undercarriage unit 10 preferably includes four mounting pads 96 secured to side frames 12 and 14. Two mounting pads 96 are attached to side frame 12 between middle wheel 22 and end pairs of wheels 20 and 24, and two other mounting pads are secured to side frame 14 in similar fashion. Each pad 96 is supported above the upper wall of its corresponding side frame with two vertical braces 98 and 100, which are best shown in FIG. 3. Mounting pads 96 are preferably provided with bolt holes, as shown in FIG. 2, corresponding to the adapter or other mounting hardware necessary to mate undercarriage unit 10 with a mechanism.

Figure 6:
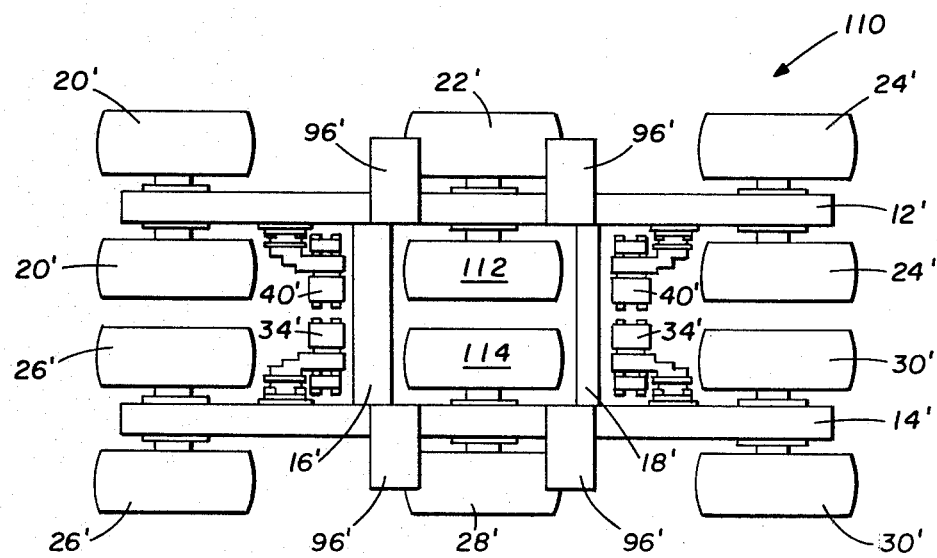
FIG. 6 is a top view of an undercarriage unit incorporating a second embodiment of the invention.

Referring to FIG. 6, there is shown an undercarriage unit 110 incorporating a second embodiment of the invention. Undercarriage unit 110 includes numerous components which are substantially identical in construction and operation to components of undercarriage unit 10 illustrated in FIGS. 1-5. Such identical components are designated in FIG. 6 with the same reference numeral employed in the description of undercarriage unit 10, but are distinguished therefrom with a prime (') denotation.

The primary distinction involves the use of two additional wheels, thereby making undercarriage unit 110 a 12-wheel unit. Wheels 112 and 114 are mounted on the inboard ends of the axles supporting middle wheels 22' and 28', respectively. Each axle in undercarriage unit 110 thus supports a pair of inboard an outboard wheels in a manner similar to axle 80 shown in FIG. 5. Wheels 22', 28', 112 and 114 comprise the lower middle wheel set of undercarriage unit 110.

The hydrostatic drive system and transmission utilized in undercarriage unit 110 is substantially identical to that described in undercarriage unit 10, except that motors 34' and 40' and their associated gear boxes and brakes have been moved outside of cross frames 16' and 18' to make room for wheels 112 and 114. The addition of wheels 112 and 114 results in a load capacity for unit 110 relatively greater than that of unit 10, which has only ten wheels, with little or no loss of turning ability or ease of skid steering due to the inboard location of wheels 112 and 114. In all other respects, undercarriage unit 110 has substantially the same advantages and operates similar to the first inventive embodiment shown in FIGS. 1-5.

Figure 7:
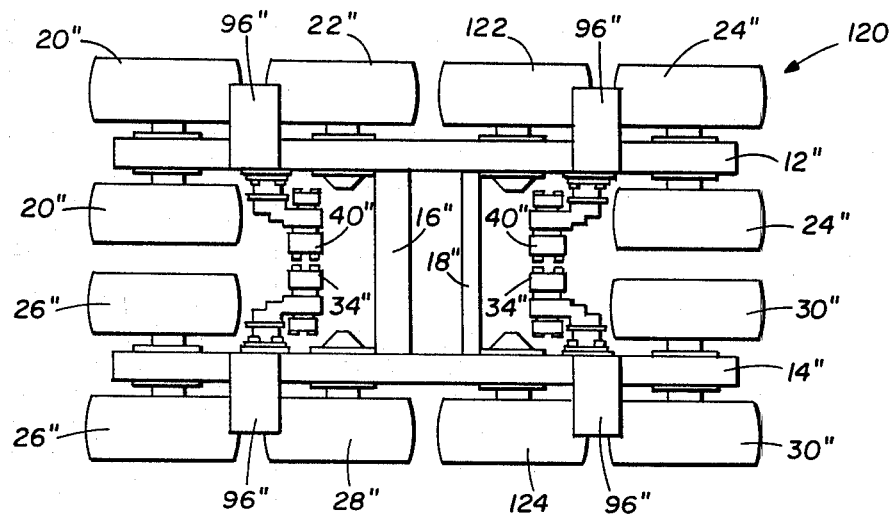
FIG. 7 is a top view of an undercarriage unit incorporating a third embodiment of the invention.
Figure 8:
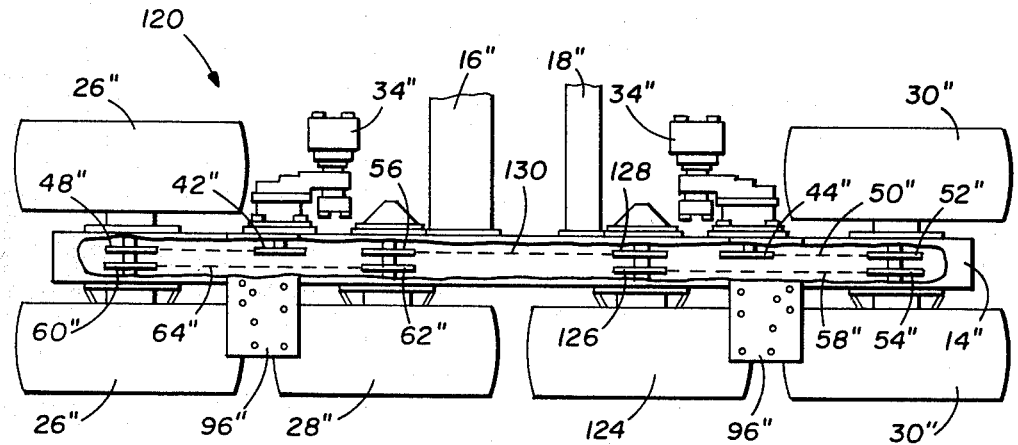
FIG. 8 is an enlarged top view of part of the undercarriage unit shown in FIG. 7, partially cut away.
Figure 9:
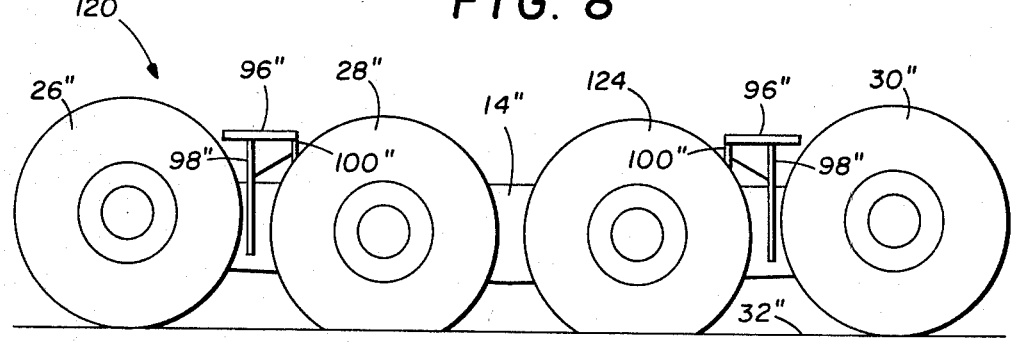
FIG. 9 is an enlarged side view of the undercarriage unit shown in FIG. 7.

Referring to FIGS. 7-9, there is shown an undercarriage unit 120 representing a third embodiment of the invention. Undercarriage unit 120 incorporates numerous components which are substantially identical in construction and operation to the components of undercarriage unit 10 illustrated in FIGS. 1-5. Such identical components are designated in FIGS. 7-9 with the same reference numeral utilized in describing undercarriage unit 10, but are distinguished therefrom with a double prime (") denotation.

The primary difference between undercarriage units 120 and 10 involves the addition of middle wheels 122 so that undercarriage unit 120 comprises a 12-wheeled unit. In contrast to undercarriage unit 110, in which the two additional wheels are mounted inboard of the side frames, wheels 122 and 124 of undercarriage unit 120 are mounted outboard of side frames 12" and 14", respectively. Wheels 122 and 124 thus comprise an additional pair of middle wheels, the bottoms of which are substantially even with the bottoms of wheels 22" and 28". Middle wheels 22", 28", 122 and 124 therefore protrude through a plane 32" extending tangent to the bottoms of endmost pairs of wheels 20", 24", 26" and 30". Wheels 122 and 124 are mounted on axles rotatably supported in the side frames like axle 66 shown in FIG. 4.

It will be apparent that undercarriage unit 120 rests primarily on its four middle wheels, with the endmost pairs of wheels being in reduced surface contact, during operation on prepared or relatively smooth surfaces. A vehicle incorporating undercarriage unit 120, however, does retain the capability of rocking forward or backward slightly depending upon the center of gravity and loading characteristics of the particular mechanism supported by the unit, whereby the advantages of both short and long wheelbases are maintained. Of course, during operation over adverse or softer terrain, all twelve wheels of undercarriage unit 120 will sink into firm engagement with the terrain until flotation occurs. Although the relatively longer length of undercarriage unit 120 necessitates slightly greater effort to effect skid steering of the unit, greater longitudinal stability results therefrom. Undercarriage unit 120 is thus particularly suited for those situations which require longitudinal stability more than maneuverability or turning ability.

Due to the addition and positioning of middle wheels 122 and 124, the transmissions of undercarriage unit 120 are somewhat different from those of undercarriage unit 10, as can be seen in FIG. 8. The wheels rotatably supported on each of the side frames 12" and 14" are drivingly interconnected and driven in unison by motors 34" and 40". Each transmission within side frames 12" and 14" include two extra sprockets and one extra chain. For example, the axle of wheel 124 includes sprockets 126 and 128 mounted thereon. Sprocket 126 is interconected by chain 58" with sprocket 54" attached to the axle of wheels 30". Sprocket 128 is interconnected by chain 130 with sprocket 56" on the axle of middle wheel 28". Motors 34" are thus connected directly to the endmost pairs of wheels 26" and 30" only, such that no drive chain therein is exposed to the power of more than one motor. This particular chain and sprocket arrangement comprising the hydrostatic drive system of undercarriage unit 120 is thus advantageous because chain overloading and breakage is avoided. In all other respects, undercarriage unit 120 operates substantially the same as the inventive embodiment shown in FIGS. 1–5.

From the foregoing, it will be understood that the present invention comprises wheeled undercarriage unit having several advantages over the prior art. The most significant advantage involves the fact that larger loads can be supported without exceeding acceptable ground pressure levels or sacrificing an undue amount of maneuverability and turning ability. Skid steering of vehicles incorporating the undercarriage units herein is facilitated by lower middle wheels. Stability of such vehicles is enhanced by the arrangement of wheels on the undercarriage unit in a way which creates a triangulation effect at the corners of the unit. Other advantages will suggest themselves to those skilled in the art.

Although particular embodiments of the invention have been illustrated in the accompanying drawings and described in the foregoing Detailed Description, it will be understood that the invention is not limited to the embodiments disclosed, but is intended to embrace any alternatives, modifications, and rearrangements and/or substitutions of parts or elements as fall within the spirit and scope of the invention.

I claim:

1. In an undercarriage unit adapted for connection to a mechanism for supporting and propelling said mechanism, said unit being of the type having a pair of side frames each rotatably supporting at least three axles with wheels mounted on the outboard ends thereof drivingly interconnected by transmissions, with the middle wheels extending below the bottoms of the endmost wheels to facilitate skid steering, the improvement comprising:
   means for rigidly interconnecting said side frames;
   the axles associated with said endmost wheels extending through said side frames;
   wheels mounted on the inboard ends of the axles carrying said endmost wheels to reduce ground pressure beneath the undercarriage unit;
   transmission means associated with each of said side frames for drivingly interconnecting the axles rotatably supported by said side frames;
   drive means mounted to each of said side frames for actuating each of said transmission means to selectively effect concurrent rotation of the axles and wheels associated with each side frame; and
   each of said drive means including at least two motors mounted on the side frame, said transmission means directly coupling an axle to no more than one of said motors.

2. An undercarriage unit, comprising:
   a pair of elongate hollow load-bearing side frames positioned in spaced apart relationship;
   means for rigidly interconnecting said side frames;
   at least three pairs of axles;
   means for rotatably supporting said axles at longitudinally spaced points along said side frames, at least three of said axles being supported on each of said side frames
   at least five pairs of wheels, one wheel being mounted on the outboard end of each of said axles and one wheel being mounted on the inboard end of each of said endmost axles;
   the middle wheels extending below a plane lying tangent to the bottoms of the endmost pairs of wheels to facilitate skid steering;
   transmission means associated with each of said side frames for drivingly interconnecting the axles rotatably supported by said side frames;
   drive means for actuating each of said transmission means to selectively effect concurrent rotation of the axles and wheels associated with each side frame; and
   said drive means comprising at least two motors mounted on each side frame, said transmission means directly coupling each motor to a single axle.

3. The undercarriage unit of claim 2, wherein the means rigidly interconnecting the side frames comprises:
a pair of cross frames secured between said side frames in mutually spaced apart relationship.

4. The undercarriage unit of claim 2, wherein each side frame is substantially rectangular in cross section and comprised of structural members around its entire periphery and along its entire length.

5. The undercarriage unit of claim 2, wherein at least some of said axles extend through one of said side frames and is rotatably supported in opposite sides of said corresponding side frame.

6. The undercarriage unit of claim 2, wherein the middle wheels have diameters substantially equal to the diameters of the endmost wheels, and are mounted for rotation about axes positioned below a plane extending through the rotational axes of the endmost wheels.

7. The undercarriage unit of claim 2, wherein the middle wheels have diameters substantially larger than the diameters of the endmost wheels, and are mounted for rotation about axes lying substantially within a plane extending through the rotational axes of the endmost wheels.

8. The undercarriage unit of claim 2, further including:
mounting pads secured to the side frames for connecting a mechanism on the undercarriage unit.

9. The undercarriage unit of claim 2, wherein said drive means comprises:
a speed reducer having an output shaft operably connected to said transmission means;
a hydraulic motor operably connected to said speed reducer; and
a brake operably connected to said speed reducer.

10. An undercarriage unit for supporting and propelling a mechanism, comprising:
a pair of elongate hollow load-bearing side frames positioned in spaced apart relationship;
means for rigidly interconnecting said side frames;
six axles, three axles being rotatably supported at longitudinally spaced points along said side frames in middle and endmost pairs;
ten wheels, six wheels being mounted on the outboard ends of said axles and four wheels being mounted on the inboard ends of said endmost axles;
the middle pair of wheels extending below a plane lying tangent to the bottoms of the endmost wheels to facilitate skid steering;
transmission means cooperating with each side frame for drivingly interconnecting the axles and wheels rotatably supported by said side frames; and
drive means for actuating each of said transmission means to selectively effect concurrent rotation of the axles and wheels on each side of the unit, each of said drive means including at least two motors secured to the side frame and extending inboard, said transmission means directly coupling an axle to no more than one of said motors in the side frame.

11. The undercarriage unit of claim 10, wherein each side frame is substantially rectangular in cross sections and comprised of structural members around its entire periphery and along its entire length.

12. The undercarriage unit of claim 10, wherein each of said axles extends through one of said side frames and is rotatably supported in opposite sides of said corresponding side frame.

13. The undercarriage unit of claim 10, further including:
mounting pads secured to said side frames for attaching the undercarriage unit to said mechanism.

14. The undercarriage unit of claim 10, further including:
two wheels mounted on the inboard ends of said middle pair of axles to further reduce ground pressure beneath the undercarriage unit.

15. The undercarriage unit of claim 10, wherein each of said transmission means includes:
two drive sprockets, each of said drive sprockets being driven by one of said motors, one drive sprocket being positioned between the middle axle and one endmost axle;
first and second sprockets mounted on said middle axle;
third and fourth sprockets mounted on one of said endmost axles;
fifth and sixth sprockets mounted on the other one of said endmost axles;
a first chain interconnecting one of said drive sprockets and said third sprocket;
a second chain interconnecting said second and fourth sprockets;
a third chain interconnecting the other one of said drive sprockets and the sixth sprocket; and
a fourth chain interconnecting the first and fifth sprockets.

16. An undercarriage unit for supporting and propelling a heavy mechanism, comprising:
a pair of elongate hollow load-bearing side frames positioned in laterally spaced apart relationship;
a pair of cross frames positioned in longitudinally spaced apart relationship rigidly interconnected between said side frames;
six axles, three axles being rotatably supported at longitudinally spaced points along said side frames in middle and endmost pairs;
ten wheels, six wheels being mounted on the outboard ends of said axles and four wheels being mounted on the inboard ends of said endmost axles;
the middle pair of wheels extending below a plane lying tangent to the bottoms of the endmost wheels to facilitate skid steering;
transmission means including sprockets and chains situated inside each side frame for drivingly interconnecting the axles and wheels rotatably supported by said side frames; and
drive means for actuating each of said transmission means to selectively effect concurrent rotation of the axles and wheels on each side of the unit, said drive means including at least two motors secured to the side frame and extending inboard of the side frame, said transmission means directly coupling a single axle to no more than one of said motors to reduce the stress on the sprockets and chains, the remaining axles being driven by sprockets and chains coupled to at least one of the direct coupled axles.

17. A undercarriage unit for supporting and propelling a mechanism, comprising:
a pair of elongate hollow load-bearing side frames positioned in spaced apart relationship;
means for rigidly interconnecting said side frames;
eight axles, four axles being rotatably supported at longitudinally spaced points along said side frames in endmost and middle pairs;

twelve wheels, eight wheels being mounted on the outboard ends of said axles and four wheels being mounted on the inboard ends of said endmost axles;

the middle pairs of wheels extending below a plane lying tangent to the bottoms of the endmost pairs of wheels to facilitate skid steering;

transmission means cooperating with each side frame for drivingly interconnecting the axles and wheels rotatably supported thereon; and drive means for actuating each of said transmission means to selectively effect concurrent rotation of the axles and wheels on each side of the unit, said drive means including at least two motors secured to each of said side frames and extending inboard of the side frame, said transmission means directly coupling a single axle to no more than one of said motors, the remaining axles being driven through coupling to at least one of the direct coupled axles.

18. The undercarriage unit of claim 17, wherein each side frame is substantially rectangular in cross section and comprised of structural members around its entire periphery and along its entire length.

19. The undercarriage unit of claim 17, wherein each of said axles extends through one of said side frames and is rotatably supported in opposite sides of said corresponding side frame.

20. The undercarriage unit of claim 17, further including:

mounting pads secured to said frames for attaching said mechanism to said undercarriage unit.

21. An undercarriage unit for supporting and propelling a mechanism, comprising:

a pair of elongate hollow load-bearing side frames positioned in spaced apart relationship;

means for rigidly interconnecting said side frames;

eight axles, four axles being rotatably supported at longitudinally spaced points along said side frames in endmost and middle pairs;

twelve wheels, eight wheels being mounted on the outboard ends of said axles and four wheels being mounted on the inboard ends of said endmost axles;

the middle pair of wheels extending below a plane lying tangent to the bottoms of the endmost pairs of wheels to facilitate skid steering;

transmission means cooperating with each side frame for drivingly interconnecting the axles and wheels rotatably supported thereon, wherein each of said transmission means includes:

two drive sprockets, one drive sprocket being positioned between one middle axle and the endmost axle adjacent thereto;

two pairs of first and second sprockets, one pair being mounted on each of said middle axles;

third and fourth sprockets mounted on one of said endmost axles;

fifth and sixth sprockets mounted on the other one of said endmost axles;

a first chain interconnecting one of said drive sprockets in said third sprocket;

a second chain interconnecting said fourth sprocket and the second sprocket in one of said middle axles;

a third chain interconnecting the other one of said drive sprockets and said fifth sprocket;

a fourth chain interconnecting said sixth sprocket and the second sprocket on the other one of said middle axles; and a fifth chain interconnecting the first sprockets on said middle axles; and drive means for actuating each of said transmission means to selectively effect concurrent rotation of the axles and wheels on one side of the unit.

22. An undercarriage unit for supporting and propelling a heavy mechanism, comprising:

a pair of elongate hollow load-bearing side frames positioned in laterally spaced apart relationship;

a pair of cross frames positioned in longitudinally spaced apart relationship rigidly interconnected between said side frames;

eight axles, four axles being rotatably supported at longitudinally spaced points along said side frames in endmost and middle pairs;

twelve wheels, eight wheels being mounted on the outboard ends of said axles and four wheels being mounted on the inboard ends of said endmost axles;

the middle pair of wheels extending below a plane lying tangent to the bottoms of the endmost pairs of wheels to facilitate skid steering;

transmission means including sprockets and chains situated inside each side frame for drivingly interconnecting the axles and wheels rotatably supported thereon; and drive means for actuating each of said transmission means to selectively effect concurrent rotation of the axles and wheels on each side of the unit, said drive means including at least two motors secured to each of said side frames and extending inboard of the side frames, said transmission means directly coupling each of said endmost axles with one of said motors, the remaining axles being driven by sprockets and chains coupled to at least one of said endmost axles.

23. An undercarriage unit, comprising:

a pair of elongate hollow load-bearing side frames positioned in spaced apart relationship;

means for rigidly interconnecting said said frames;

at least three pairs of axles;

means for rotatably supporting said axles at longitudinally spaced points along said side frames, at least three of said axles being supported on each of said side frames;

a plurality of wheels, one wheel being mounted on at least the outboard end of each of said axles;

the middle wheels extending below a plane lying tangent to the bottoms of the endmost wheels to facilitate skid steering;

transmission means associated with each of said side frames for drivingly interconnecting the axles rotatably supported by said side frames;

drive means for actuating each of said transmission means to selectively effect concurrent rotation of the axles and wheels associated with each side frame; and said drive means comprising at least two motors mounted on each side frame, said transmission means directly coupling each motor to a single axle.

* * * * *